United States Patent Office 3,155,660

Patented Nov. 3, 1964

3,155,660

PROCESS FOR THE PREPARATION OF 19-NOR-$\Delta^{4,9}$-PREGNADIEN-3,20-DIONE AND INTERMEDIATES Gerard Nomine, Noisy-le-Sec, Robert Bucourt, Clichy-sous-Bois, and Jean Tessier, Paris, France, assignors to Roussel-UCLAF, S.A., Paris, France, a corporation of France No Drawing. Filed Apr. 30, 1962, Ser. No. 191,265
Claims priority, application France May 8, 1961
18 Claims. (Cl. 260—247.7)

The present invention relates to a process for the preparation of 19-nor-$\Delta^{4,9}$-pregnadien-3,20-dione having the formula:

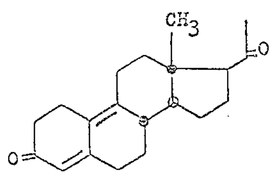

(I)

and to the intermediates produced in this process.

Some American authors have recently described the preparation of a new class of biologically active compounds which are 19-nor-$\Delta^{4,9}$-3-ketonic steroids (see Perelman et al., J. Am. Chem. Soc., 1960, 82, 2402–3).

Among the compounds discussed by these authors is 19-nor-$\Delta^{4,9}$-pregnadien-3,20-dione, but the American workers did not succeed in isolating this compound in its pure state.

An object of the present invention is a new process of preparation of pure 19-nor-$\Delta^{4,9}$-pregnadien-3,20-dione by a total synthesis which does not require the use of costly natural products as starting compounds.

Another object of the invention is the development of a process for the production of 19-nor-$\Delta^{4,9}$-pregnadien-3,20-dione which comprises the steps of (*a*) reacting 5-methoxy-$\Delta^{5,7,9}$-des-A-estratrien-17$\beta$-ol with an alkaline oxidizing agent in an inert organic solvent, (*b*) reacting the 5-methoxy-$\Delta^{5,7,9}$-des-A-estratrien-17-one with acetylene in the presence of an alkaline condensation agent in an inert organic solvent, (*c*) esterfying the 5-methoxy-17$\alpha$-ethynyl-$\Delta^{5,7,9}$-des-A-estratrien-17$\beta$-ol with an esterfying derivative of a hydrocarbon carboxylic acid having from 2 to 7 carbon atoms, (*d*) hydrating the acyloxy compound having the formula:

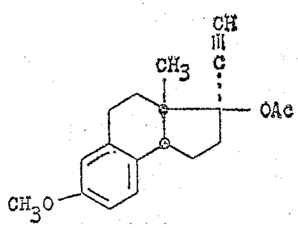

wherein Ac represents the acyl radical of a hydrocarbon carboxylic acid having from 2 to 7 carbon atoms in the presence of a hydration catalyst, (*e*) reducing the acetyl compound having the formula:

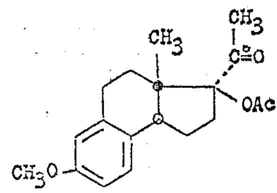

wherein Ac has the above-assigned meaning by means of the action of an alkali metal in liquid ammonia, (*f*) reacting the 19-nor-$\Delta^{9}$-des-A-pregnen-20-ol-5-one with an acidic oxidizing agent in an inert organic solvent, (*g*) reacting the 19-nor-$\Delta^{9}$-des-A-pregnen-5,20-dione with a secondary amine having the formula:

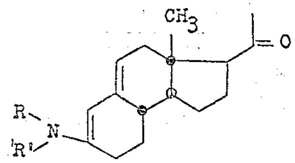

wherein R by itself represents an alkyl having from 1 to 8 carbon atoms, R′ by itself represents an alkyl having from 1 to 8 carbon atoms and R and R′ taken together represent a bridging radical selected from the group consisting of alkylene having from 4 to 5 carbon atoms and ethyloxy-ethylene in the presence of an inert organic solvent, (*h*) condensing the corresponding enamine of the formula:

wherein R and R′ have the above assigned meanings with a 1-halo-3-chloro-2-butene in an inert organic solvent, (*i*) hydrolyzing the 3-chloro-4,5-seco-19-nor-$\Delta^{2,9}$-pregnadien-5,20-dione by the action of an acidic hydrolyzing agent, (*j*) cyclizing the 4,5-seco-19-nor-$\Delta^{9}$-pregnen-3,5,20-trione by the action of an alkaline condensation agent in an inert organic solvent, and (*k*) recovering said 19-nor-$\Delta^{4,9}$-pregnadien-3,20-dione.

A still further object of the invention is the obtention of the following intermediates:

(*a*) 5-methoxy-$\Delta^{5,7,9}$-des-A-estratrien-17-one.

(*b*) 5-methoxy-17$\alpha$-ethynyl-$\Delta^{5,7,9}$-des-A-estratrien-17$\beta$-ol.

(*c*) An acyloxy compound having the formula:

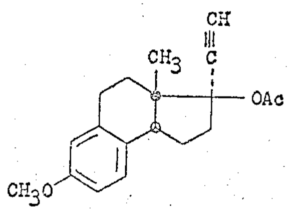

wherein Ac represents the acyl radical of a hydrocarbon carboxylic acid having from 2 to 7 carbon atoms.

(*d*) An acetyl compound having the formula:

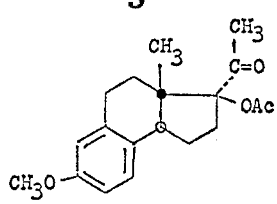

wherein Ac represents the acyl radical of a hydrocarbon carboxylic acid having from 2 to 7 carbon atoms.

(*e*) 19-nor-$\Delta^9$-des-A-pregnen-20-ol-5-one.

(*f*) 19-nor-$\Delta^9$-des-A-pregnen-5,20-dione.

(*g*) An enamine of the formula:

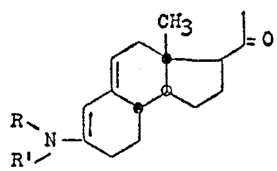

wherein R by itself represents an alkyl having from 1 to 8 carbon atoms, R' by itself represents an alkyl having from 1 to 8 carbon atoms and R and R' taken together represent a bridging radical selected from the group consisting of alkylene having from 4 to 5 carbon atoms and ethyloxyethylene.

(*h*) 3-chloro-4,5-seco-19 - nor - $\Delta^{2,9}$ - pregnadien-5,20-dione.

(*i*) 4,5-seco-19-nor-$\Delta^9$-pregnen-3,5,20-trione.

These and other objects of the invention will become apparent as the description thereof proceeds.

We have discovered a novel process of preparing pure 19-nor-$\Delta^{4,9}$-pregnadien-3,20 dione starting from 5-methoxy-$\Delta^{5,7,9}$-des-A-estratrien-17β-ol, a synthetically produced material thus avoiding the use of costly natural products as starting compounds.

The process, outlined in the objects, is indicated by the flow diagram of Table I.

TABLE I

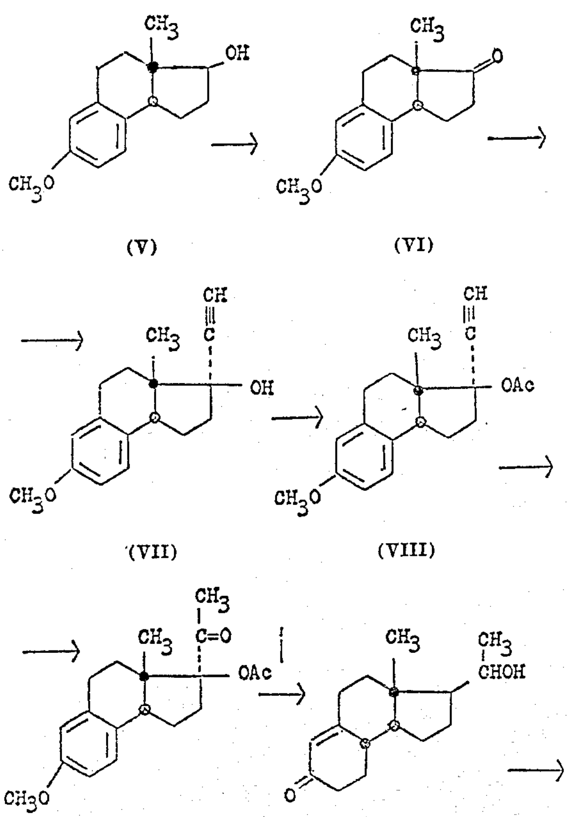

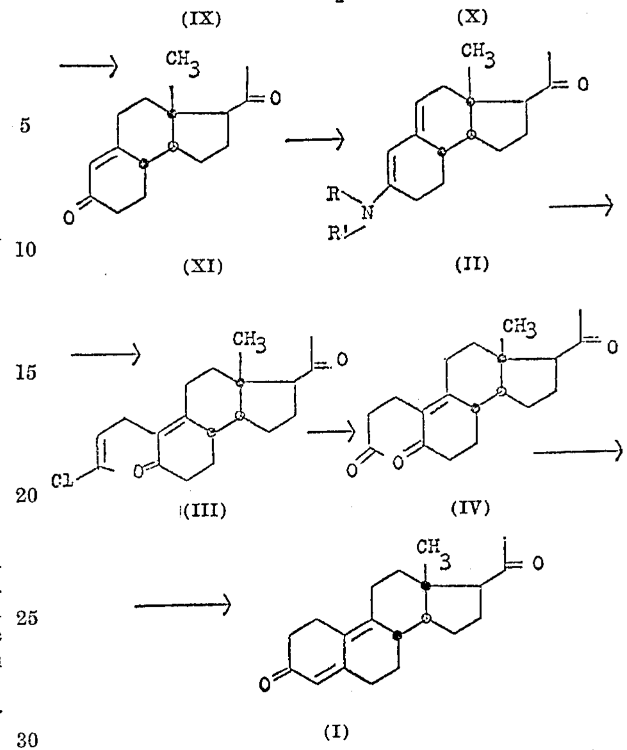

The 5-methoxy-$\Delta^{5,7,9}$-des-A-estratrien-17β-ol, V, used as a starting compound is described by Velluz et al., C.R. Acad. Sci., 250, 1084 (1960). This compound can be racemic or one of its stereospecific isomers, preferably the dextrorotatory in methanol isomer which gives a final product having the levorotation of the natural series.

Step (*a*), the oxidation of 5-methoxy-$\Delta^{5,7,9}$-des-A-estratrien-17β-ol, V, into the corresponding 17-one, VI, is preferably conducted in an inert organic solvent such as methylene chloride with an alkaline oxidizing agent such as manganese bioxide in the presence of an alkali metal carbonate such as potassium carbonate at about room temperature.

Step (*b*), the acetylene condensation step of preparing compound VII is preferably conducted in the presence of an alkaline condensation agent such as an alkali metal tert.-lower-alkanolate such as sodium t.-amylate at about room temperature.

Step (*c*), the esterification step of preparing compound VIII is preferably conducted with an esterifying derivative of a hydrocarbon carboxylic acid having from 2 to 7 carbon atoms such as the acid or acid anhydride in the presence of a strong acid catalyst such as p-toluene sulfonic acid at about room temperature. While any hydrocarbon carboxylic acid having from 2 to 7 carbon atoms may be employed, such as lower alkanoic acids, lower alkenoic acids, alkane dioic acids, benzoic acid, etc., the use of acetic acid anhydride to produce the acetoxy derivative is preferred.

Step (*d*), the step of hydrating compound VIII to give the 17α-acetyl compound, IX, is preferably conducted with a hydration catalyst such as a water-containing cation exchange resin in the acid form treated with a mercuric salt such as the acetate, in a lower alkanol such as ethanol at the reflux temperature.

Step (*e*), the step of reducing the ketone and aromatic ring of compound IX is preferably carried out with lithium as the alkali metal to give 19-nor-$\Delta^9$-des-A-pregnen-20-ol-5-one, X.

Step (*f*), the step of oxidizing the 20 hydroxy group of compound X is preferably conducted with an acidic oxidizing agent such as a mixture of acetic acid and chromic acid in an acetic acid media at about room temperature to give the corresponding 20 ketone, XI.

Step (*g*), the preparation of the enamine, II, is preferably conducted by reacting the compound of Formula XI with a secondary amine having the formula:

$$\begin{matrix} R \\ & \diagdown \\ & & NH \\ & \diagup \\ R' \end{matrix}$$

where R by itself represents an alkyl radical having from 1 to 8 carbon atoms, R' by itself represents an alkyl radical having from 1 to 8 carbon atoms and R and R' taken together represent a bridging radical selected from the group consisting of alkylene having from 4 to 5 carbon atoms and ethyloxyethylene such as, for example, pyrrolidine, piperidine, morpholine, dimethylamine, etc.

This reacttion is advantageously executed by mixing the required reactants and putting them in solution in an inert organic solvent such as benzene, chloroform, a lower alkanol such as methanol or ethanol, or even in a mixture of any two solvents mentioned above, and by operating preferably at room temperature or about room temperature.

In these conditions the reaction is generally terminated in about one hour and the material recovered is an enamine of the Formula II in which the group:

$$\begin{matrix} & & R \\ & \diagup \\ -N \\ & \diagdown \\ & & R' \end{matrix}$$

corresponds to a radical such as pyrrolidyl, piperidyl, morpholinyl, dimethylamine, etc.

The pyrrolidyl derivative, 5-pyrrolidyl-19-nor-$\Delta^{5(10),9(11)}$-des-A-pregadien-20-one (II, $N\langle^{R}_{R'}\rangle$=pyrrolidyl)

is the preferred enamine.

Step (*h*), the condensation of the enamine with a 1-halo-3-chloro-2-butene such as 1-iodo-3-chloro-2-butene or the corresponding dichloro derivative is effected advantageously in an inert organic solvent such as dimethylformamide at a temperature of between about −10° C. and +10° C. and preferably about 0° C.

It is particularly advantageous to take as the butene derivative 1-iodo-3-chloro-2-butene which can be prepared in situ in the course of the reaction by effecting it in the presence of an alkali metal iodide such as potassium iodide and 1,3-dichloro-2-butene.

The condensation product, compound III, is next, in Step (*i*), dissolved in an alkanoic acid such as acetic acid and subjected to the action of an acidic hydrolyzing agent such as, for example, concentrated sulfuric acid which gives the desired compound IV.

The hydrolysis of the 3-chloro-2-butenyl side chain can be effected with any hydrolyzing agent that will cause the chlorine radical to be replaced with a hydroxyl radical and will simultaneously cause the enolic hydroxy group formed to revert to the more stable ketone. It is preferable to use a concentrated aqueous solution of a strong mineral acid, such as concentrated sulfuric acid. The reaction occurs at about room temperature.

The final Step (*j*) of cyclizing compound IV is preferably conducted by dissolving compound IV in an anhydrous inert organic solvent such as toluene and reacting with an alkaline condensation agent, preferably an alkali metal tert.-lower-alkanolate such as sodium t.-amylate at about 0° C.

The following example is illustrative of the invention. It is not, however, to be construed as limitative in any manner. It is obvious that other expedients known to those skilled in the art may be employed.

*Example.—Preparation of 19-Nor-$\Delta^{4,9}$-Pregnadien-3,20-Dione, I*

STEP A: OXIDATION 3 gm. of 5-methoxy-$\Delta^{5,7,9}$-des-A-estratrien-17β-ol melting at 69° C. and having a specific rotation $$[\alpha]_D^{20}=+15°\pm3° \text{ (c.=1\% in methanol)}$$

obtained according to Velluz et al., C.R. Acad. Sci., 250, 1084 (1960), were dissolved in 400 cc. of methylene chloride, 100 mg. of anhydrous potassium carbonate and 30 gm. of manganese bioxide were added thereto, and the reaction mixture was agitated for a period of 56 hours at room temperature. The solution was filtered. The filtrate was evaporated to dryness under vacuum and the residue was recrystallized from ethanol. 5-methoxy-$\Delta^{5,7,9}$-des-A-estratrien-17-one was obtained having a melting point of 89° C. and a specific rotation $$[\alpha]_D^{20}=+99° \text{ (c.=1\% in methanol)}$$

The product occurred in the form of white star-like crystals, very soluble in methylethylketone and ethyl acetate, soluble in alcohol and hot isopropyl ether.

*Analysis.*—$C_{15}H_{18}O_2$; molecular weight=230.30. Calculated: C, 78.23%; H, 7.88%. Found: C, 78.2%, H, 7.8%.

U.V. spectra (in methanol):

$$\lambda_{max.}=279 \text{ m}\mu\ E^{1\%}_{1\,cm.}=91.8$$

$$\lambda_{max.}=287.5 \text{ m}\mu\ E^{1\%}_{1\,cm.}=79.0$$

This compound is not described in the literature.

STEP B: ETHYNYLATION 30 cc. of 0.99 N solution of sodium t.-amylate in toluene were introduced into 270 cc. of anhydrous benzene. The mixture was heated under an atmosphere of nitrogen to 60° C. Then acetylene was allowed to bubble therethrough for a period of 30 minutes. The temperature was brought back to room temperature. 40 CC. of a benzenic solution containing 2.173 gm. of dextrorotatory in methanol 5-methoxy-$\Delta^{5,7,9}$-des-A-estratrien-17-one were added while agitating. The reaction mixture was allowed to stand at room temperature for a period of 2 hours. Next it was poured into water and neutralized by the addition of acetic acid. The aqueous phase was decanted, extracted with ether. Then the organic phases were combined, dried and evaporated to dryness under vacuum. The residue was recrystallized from cyclohexane and furnishes 5-methoxy-17α-ethynyl-$\Delta^{5,7,9}$-des-A-estratrien-17β-ol having a melting point of 98.5° C. and a specific rotation $[\alpha]_D^{20}=-70.6°$ (c.=1% in methanol).

The product occurred in the form of white needles, very soluble in alcohol, ether, acetone, benzene and chloroform, insoluble in water.

*Analysis.*—$C_{17}H_{20}O_2$; molecular weight=256.33. Calculated: C, 79.66%; H, 7.86%; O, 12.48%. Found: C, 79.3%; H, 7.8%; O, 12.4%.

The I.R. spectra presents in particular bands at 3 603 cm.$^{-1}$ and at 3 310 cm.$^{-1}$.

This compound is not described in the literature.

STEP C: ESTERIFICATION 2.08 gm. of 5-methoxy-17α-ethynyl-$\Delta^{5,7,9}$-des-A-estratrien-17β-ol were dissolved in 20 cc. of acetic anhydride. 1 gm. of p-toluene sulfonic acid was added. The mixture was agitated until solution occurred and then allowed to stand for a period of 24 hours at room temperature. Thereafter, the mixture was poured in water, agitated for a half hour and extracted with methylene chloride.

The methylene chloride extracts were combined, dried and evaporated to dryness under vacuum. The residue was decolorized by magnesium silicate in methylene chloride. By crystallization from isopropyl ether, 5-methoxy-17β-acetoxy-17α-ethynyl-$\Delta^{5,7,9}$-des-A-estratriene was obtained having a melting point of 93.5° C. and a specific rotation $[\alpha]_D^{20}=-54°$ (c.=1.5% in methanol).

The product occurred in the form of white crystals, soluble in alcohol, insoluble in water.

*Analysis*.—$C_{19}H_{22}O_3$; molecular weight=298.37. Calculated: C, 76.48%; H, 7.43%. Found: C, 76.5%; H, 7.4%.

This compound is not described in the literature.

STEP D: HYDRATION (*a*) *Preparation of the catalyst*.—200 gm. of Dowex 50 resin, a commercial cation exchanger, in acid form were introduced into 1 liter of an aqueous solution of N sulfuric acid. The mixture was agitated for a period of 30 minutes and decanted. The resin was washed with water. Then 3 gm. of mercuric acetate and 1 liter of water were added and agitated for a period of 10 minutes. The resin was decanted and washed again with water.

(*b*) *Hydration*.—5 gm. of 5-methoxy-17β-acetoxy-17α-ethynyl-$\Delta^{5,7,9}$-des-A-estratriene and 62.5 gm. of the catalyst obtained as described above were introduced into 125 cc. of ethanol and heated to reflux while agitating for a period of 7 hours. The mixture was filtered. 600 cc. of methylene chloride were added to the filtrate. Ethanol was separated by entraining it in successive washings with distilled water. The solution was treated with animal black, filtered and then evaporated to dryness under vacuum. The residue crystallized from ethanol and furnished 5-methoxy-17β-acetoxy-17α-acetyl-$\Delta^{5,7,9}$-des-estratriene having a melting point of 130° C. and a specific rotation $[\alpha]_D^{20}=+40°$ (c.=1% in methanol).

The product occurred in the form of white crystals, very soluble in acetone, benzene and chloroform, soluble in isopropyl ether and in hot alcohol, insoluble in water.

*Analysis*.—$C_{19}H_{24}O_4$; molecular weight=316.38. Calculated: C, 72.12%; H, 7.65%. Found: C, 72.2%; H, 7.4%.

This compound is not described in the literature.

STEP E: REDUCTION 0.786 gm. of lithium in small bits was introduced while cooling to 360 cc. of liquid ammonia. 72 cc. of anhydrous ether and 1.141 gm. of 5-methoxy-17β-acetoxy-17α-acetyl-$\Delta^{5,7,9}$-des-A-estratriene in solution in 150 cc. of anhydrous ether were added. The reaction mixture was maintained while agitating under an atmosphere of nitrogen and at a temperature of −45° C. for a period of an hour and a half. Next slowly 70 cc. of anhydrous methanol were added. Then at −45° C. in a space of one hour, 3.6 gm. of lithium were added. The ammonia was evaporated. The residue was taken up by a mixture of 300 cc. of water and 200 cc. of ether. The ethereal phase was decanted, washed with water, dried and evaporated to dryness under vacuum. The residue was dissolved in 50 cc. of methanol, 12.5 cc. of hydrochloric acid and 25 cc. of water and heated to reflux for a period of one hour. The mixture was poured into water, extracted with methylene chloride. The methylene chloride extract was evaporated to dryness and the residue was subject to chromatography over silica gel. Elution with methylene chloride containing 10% of acetone furnished amorphous $\Delta^9$-19-nor-des-A-pregnen-20-ol-5-one having a specific rotation $[\alpha]_D^{20}=-23.3°$ (c.=1.3% in methanol).

The product is very soluble in acetone, benzene and chloroform, slightly soluble in ether.

U.V. spectra (in methanol):

$$\lambda_{max.}=240\ m\mu;\ E^{1\%}_{1\ cm.}=557$$

This compound is not described in the literature.

STEP F: OXIDATION 100 mg. of $\Delta^9$-19-nor-des-A-pregnen-20-ol-5-one were dissolved in 10 cc. of acetic acid. 0.25 cc. of a solution of 600 mg. of chromium trioxide in 5 cc. of acetic acid containing 10% water were added. The reaction mixture was agitated at room temperature for a period of one hour. Then 0.5 cc. of methanol were added and the mixture was allowed to stand for a period of 45 minutes. The mixture was poured into water, neutralized by the addition of sodium bicarbonate and extracted with methylene chloride. The extracts supplied, upon evaporation under vacuum, a residue constituting the $\Delta^9$-19-nor-des-A-pregnen-5,20-dione, which was purified by subjecting to chromatography over silica gel. A white product was obtained having a melting point of 80° C. and a specific rotation $[\alpha]_D^{20}=+53°$ (c.=0.75% in methanol), which was very soluble in the usual organic solvents, insoluble in water.

*Analysis*.—$C_{16}H_{22}O_2$; molecular weight=246.34. Calculated: C, 78.00%; H, 9.00%. Found: C, 77.7%; H, 8.8%.

U.V. spectra (in ethanol):

$$\lambda_{max.}=239\ m\mu;\ \epsilon=16,200$$

This compound is not described in the literature.

STEP G: FORMATION OF THE ENAMINE, II 2 gm. of $\Delta^9$-19-nor-des-A-pregnen-5,20-dione were introduced into 0.74 cc. of pyrrolidine. By slow heating, dissolution was obtained. The solution was cooled and 5 cc. of anhydrous methanol were added thereto. The reaction mixture was then allowed to stand at a temperature of −5° C. to −10° C. for a period of one hour. The product formed was vacuum filtered, washed with methanol and dried and the 5-pyrrolidyl-$\Delta^{5(10),9(11)}$-19-nor-des-A-pregnadien-20-one, II (NRR′ represents the pyrrolidyl radical), was obtained having a melting point of 142° C. and a specific rotation $[\alpha]_D^{20}=+251°$ (c.=0.5% in pyridine).

The product occurred in the form of yellow needles, soluble in benzene, slightly soluble in alcohol.

*Analysis*.—$C_{20}H_{29}ON$; molecular weight=299.44. Calculated: N, 4.68%. Found: N, 4.7%.

This compound is not described in the literature.

STEP H: 3-CHLORO-4,5-SECO-19-NOR-$\Delta^{2,9}$-PREGNADIEN-5,20-DIONE, III 5.16 gm. of 5-pyrrolidyl-19-nor-$\Delta^{5(10),9(11)}$-des-A-pregnadien-20-one having a melting point of 142° C. and a specific rotation $[\alpha]_D^{20}=+251°$ (c.=0.5% in pyridine) were introduced into 40 cc. of dimethylformamide under an atmosphere of nitrogen. Then 2.88 gm. of potassium iodide and 3.08 gm. of 1,3-dichloro-2-butene were added. The reaction mixture was agitated at 0° C. for a period of an hour and a half, then allowed to stand at 0°C. overnight. The reaction mixture was poured into water and extracted with ether. The ethereal extracts were combined, washed with an aqueous solution containing 1% of sodium bisulfite, then with water. After drying and filtration, the ethereal extracts were evaporated to dryness under vacuum and 5.850 gm. of a product were obtained which was subject to chromatography over magnesium silicate. Elution with methylene chloride furnished 5 gm. of 3-chloro-4,5-seco-19-nor-$\Delta^{2,9}$-pregnadien-5,20-dione, III.

The product occurred in the form of a pale yellow oil which was used as such for the next step of the synthesis.

This compound is not described in the literature.

STEP I: 4,5-SECO-19-NOR-$\Delta^9$-PREGNEN-3,5,20-TRIONE, IV 5 g. of 3-chloro-4,5-seco-19-nor-$\Delta^{2,9}$-pregnadien-5,20-dione, III, were dissolved in 5 cc. of acetic acid. This solution was introduced drop by drop into 25 cc. of sulfuric acid cooled to −15° C. and, after the addition, the solution was agitated at room temperature for a period of a half hour, then poured into water. Sodium bicarbonate was added until the solution was neutralized. Then the aqueous solution was extracted with methylene chloride. The extracts were combined, washed with water, dried, filtered and evaporated to dryness under vacuum. The residue was subjected to chromatography over silica gel and elution with methylene chloride containing 4% of acetone. 4.2 gm. of 4,5-seco-19-nor-$\Delta^9$-pregnen-3,5,20-trione, IV, were obtained.

The product occurred in the form of an oil having a specific rotation $[\alpha]_D^{20}=+37°$ (c.=1% in methanol). This compound is not described in the literature.

STEP J: 19-NOR-$\Delta^{4,9}$-PREGNADIEN-3,20-DIONE, I 1.67 gm. of 4,5-seco-19-nor-$\Delta^9$-pregnen-3,5,20-trione were dissolved in 70 cc. of anhydrous toluene. The solution was cooled to 0° C. Then 4.2 cc. of a 1.28 N sodium t.-amylate solution in toluene were added.

The reaction mixture was agitated under an atmosphere of nitrogen for a period of 2 hours and 20 minutes. Next 0.4 cc. of acetic acid were added to it. The mixture was washed with water, dried and evaporated to dryness under vacuum. The residue was washed with ether and then allowed to stand in a refrigerator and crystallized easily. It was purified by subjecting it to chromatography over magnesium silicate and elution with methylene chloride, then by crystallization in methanol containing 50% water.

Yield: 1 gm. (being about 60%) of 19-nor-$\Delta^{4,9}$-pregnadien-3,20-dione having a melting point of 104° C. and a specific rotation $[\alpha]_D^{20}=-209°$ (c.=0.5% in methanol).

The product occurred in the form of white crystals, very soluble in the usual organic solvents, such as alcohol, ether, acetone, benzene and chloroform, slightly soluble in cyclohexane and isopropyl ether, insoluble in water.

*Analysis*.—$C_{20}H_{26}O_2$; molecular weight=298.4. Calculated: C, 80.49%; H, 8.78%. Found: C, 80.4%; H, 8.8%.

U.V. spectra:

$$\lambda_{\text{inflexion}}=236\ m\mu;\ E^{1\%}_{1\ cm.}=163$$

$$\lambda_{\text{max.}}=303\ m\mu;\ E^{1\%}_{1\ cm.}=700;\ \epsilon=20,900$$

The preceding example is not to be construed as limiting the invention. It is evident to one skilled in the art that temperatures, the nature of the solvents, the hydrocarbon carboxylic acid ester or the secondary amine may be varied or that equivalent techniques may be used without departing from the spirit of the invention or the scope of the appended claims.

We claim:

1. A process for the production of 19-nor-$\Delta^{4,9}$-pregnadien-3,20-dione which comprises the steps of (*a*) reacting 5-methoxy-$\Delta^{5,7,9}$-des-A-estratrien-17β-ol with an alkaline oxidizing agent in an inert organic solvent, (*b*) reacting the 5-methoxy-$\Delta^{5,7,9}$-des-A-estratrien-17-one with acetylene in the presence of an alkali metal tert.-lower-alkanolate in an anhydrous inert organic solvent, (*c*) esterifying the 5-methoxy-17α-ethynyl-$\Delta^{5,7,9}$-des-A-estratrien-17β-ol with an esterifying derivative of a hydrocarbon carboxylic acid having from 2 to 7 carbon atoms, (*d*) hydrating the acyloxy compound of the formula:

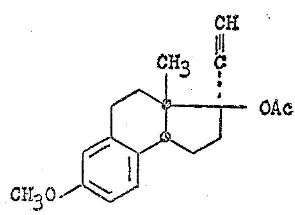

wherein Ac represents the acyl radical of a hydrocarbon carboxylic acid having from 2 to 7 carbon atoms selected from the group consisting of alkanoic acids, alkenoic acids, alkanedioic acids and benzoic acid in the presence of a water-containing cation exchange resin in the acid form treated with a mercuric salt, (*e*) reducing the acetyl compound of the formula:

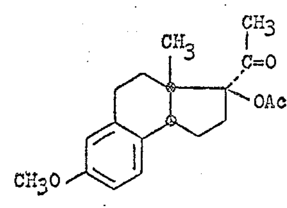

wherein Ac has the above-assigned meaning by means of the action of an alkali metal in liquid ammonia, (*f*) reacting the 19-nor-$\Delta^9$-des-A-pregnen-20-ol-5-one with an acidic oxidizing agent in an inert organic solvent, (*g*) reacting the 19-nor-$\Delta^9$-des-A-pregnen-5,20-dione with a secondary amine of the formula:

$$\begin{matrix} R \\ & \diagdown \\ & & NH \\ & \diagup \\ R' \end{matrix}$$

wherein R and R' are selected from the group consisting of alkyl having from 1 to 8 carbon atoms and taken together with the nitrogen atom from a member selected from the group consisting of pyrrolidyl, piperidyl and morpholinyl in the presence of an inert organic solvent, (*h*) condensing the corresponding enamine of the formula:

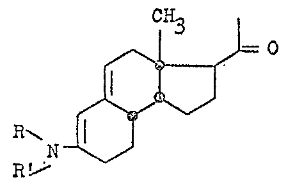

wherein R and R' have the above assigned meanings with a 1-halo-3-chloro-2-butene in an inert organic solvent, (*i*) hydrolyzing the 3-chloro-4,5-seco-19-nor-$\Delta^{2,9}$-pregnadien-5,20-dione by the action of a concentrated aqueous solution of a strong mineral acid, (*j*) cyclizing the 4,5-seco-19-nor-$\Delta^9$-pregnen-3,5,20-trione by the action of an alkali metal tert.-lower-alkanolate in an anhydrous inert organic solvent, and (*k*) recovering said 19-nor-$\Delta^{4,9}$-pregnadien-3,20-dione.

2. The process of claim 1 wherein said alkaline oxidizing agent in step (*a*) is manganese bioxide in the presence of an alkali metal carbonate.

3. The process of claim 1 wherein said alkali metal tert.-lower-alkanolate in steps (*b*) and (*j*) is sodium t.-amylate.

4. The process of claim 1 wherein said esterifying derivative of a hydrocarbon carboxylic acid having from 2 to 7 carbon atoms of step (*c*) is acetic acid anhydride.

5. The process of claim 1 wherein said alkali metal of step (*e*) is lithium.

6. The process of claim 1 wherein said acidic oxidizing agent of step (*f*) is a mixture of acetic acid and chromic acid.

7. The process of claim 1 wherein said secondary amine of step (*g*) is pyrrolidine.

8. The process of claim 1 wherein said 1-halo-3-chloro-2-butene of step (*h*) is 1,3-dichloro-2-butene in the presence of an alkali metal iodide.

9. The process of claim 1, step (*i*) wherein the concentrated aqueous solution of a strong mineral acid is a mixture of concentrated sulfuric acid and acetic acid.

10. 5-methoxy-$\Delta^{5,7,9}$-des-A-estratrien-17-one.

11. 5-methoxy-17α-ethynyl-$\Delta^{5,7,9}$-des-A-estratrien-17β-ol.

12. An acyloxy compound of the formula:

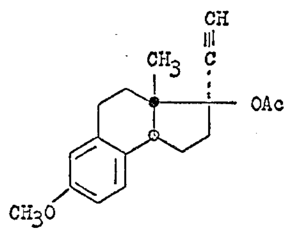

wherein Ac represents the acyl radical of a hydrocarbon carboxylic acid having from 2 to 7 carbon atoms selected from the group consisting of alkanoic acids, alkenoic acids, alkanedioic acids and benzoic acid.

13. An acetyl compound of the formula:

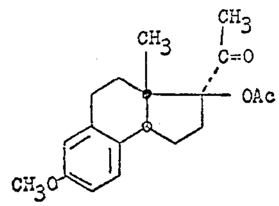

wherein Ac represents the acyl radical of a hydrocarbon carboxylic acid having from 2 to 7 carbon atoms selected from the group consisting of alkanoic acids, alkenoic acids, alkanedioic acids and benzoic acid.

14. 19-nor-$\Delta^9$-des-A-pregnen-20-ol-5-one.

15. 19-nor-$\Delta^9$-des-A-pregnen-5,20-dione.

16. 3 - chloro-4,5-seco - 19 - nor-$\Delta^{2,9}$-pregnadien-5,20-dione.

17. 4,5-seco-19-nor-$\Delta^9$-pregnen-3,5,20-trione.

18. An enamine of the formula:

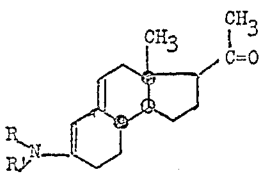

wherein R and R' are selected from the group consisting of alkyl having from 1 to 8 carbon atoms and taken together with the nitrogen atom form a member selected from the group consisting of pyrrolidyl, piperidyl and morpholinyl.

References Cited in the file of this patent

Legrand et al.: "Bull. Soc. Chim. France" (1961), page 1689.